United States Patent [19]

Vaidya

[11] Patent Number: 5,298,537

[45] Date of Patent: Mar. 29, 1994

[54] POLYOXYMETHYLENE COMPOSITIONS CONTAINING AT LEAST ONE ENCAPSULATED NUCLEANT

[75] Inventor: Shailaja R. Vaidya, Parkersburg, W. Va.

[73] Assignee: E. I. Du Pont de Nemours and Company, Wilmington, Del.

[21] Appl. No.: 865,880

[22] Filed: Apr. 9, 1992

[51] Int. Cl.$^5$ .............................................. C08K 9/10
[52] U.S. Cl. ................................... 523/205; 523/200;
523/207; 524/377; 524/404; 524/425; 524/451; 524/492
[58] Field of Search ..................... 523/200, 205, 207; 524/377, 404, 425, 451, 492

[56] References Cited

U.S. PATENT DOCUMENTS

| | | | |
|---|---|---|---|
| 3,085,989 | 4/1963 | Jordan ................................. | 523/205 |
| 3,179,637 | 4/1965 | Brodt et al. ......................... | 523/205 |
| 3,704,275 | 11/1972 | Burg et al. .......................... | 260/823 |
| 3,795,715 | 3/1974 | Cherdron et al. .................. | 260/823 |
| 4,670,508 | 6/1987 | Ohdaira et al. ...................... | 525/64 |

FOREIGN PATENT DOCUMENTS

| | | |
|---|---|---|
| 60-104152 | 6/1985 | Japan . |
| 62-22846 | 7/1985 | Japan . |
| 60-149664 | 8/1985 | Japan . |

*Primary Examiner*—Paul R. Michl
*Assistant Examiner*—John J. Guarriello

[57] ABSTRACT

Incorporation of an encapsulated nucleant made from an encapsulant polymer and a nucleant, wherein the encapsulant polymer is selected from linear low density polyethylene, high density polyethylene, and polypropylene, into polyoxymethylene compositions results in a decrease in the center line porosity of polyoxymethylene extruded stock shape parts, without also reducing the rate of extrusion. The compositions are especially useful for extrusion into stock shape parts, such as rod, slab, sheet, and tube stock, which are used for machined parts (like artificial limbs and complex gears), die cut parts (like washers and gaskets), and control cable inners.

7 Claims, No Drawings

POLYOXYMETHYLENE COMPOSITIONS CONTAINING AT LEAST ONE ENCAPSULATED NUCLEANT

BACKGROUND OF THE INVENTION

Technical Field

This invention relates to certain polyoxymethylene compositions containing an encapsulated nucleant which, when extruded into stock shapes, such as rod, slab, sheet, and tube, have improved center line porosity values in comparison to comparable compositions that lack the encapsulated nucleant and that are extruded at the same rate.

Compositions based on polyoxymethylenes of relatively high number average molecular weight (i.e., 10,000 to 100,000) are useful in preparing semi-finished and finished articles by stock shape extrusion, compression molding, injection molding, blow molding, rotational molding, melt spinning, stamping and thermoforming techniques commonly used with thermoplastic materials. Finished articles made from such compositions possess desirable physical properties, including high stiffness, strength, low coefficient of friction, and good wear and solvent resistance. However, in certain applications, especially stock shape extrusion, it is desirable to reduce the center line porosity of the polyoxymethylene composition. By the present invention, the center line porosity of polyoxymethylene compositions is found to be lowered, in comparison to comparable compositions, extruded at the same rate by the inclusion of therein of low levels of particular types of encapsulated nucleants.

The compositions of the present invention are especially useful in those applications where a polyoxymethylene composition is extruded into a stock shape and where it is desired that such stock shapes have reduced center line porosity, without slowing the rate of extrusion. Stock shapes include rods, slabs, sheets, tubes, and other symmetrical shapes. Rod and slab stock shapes are used as blanks in machining processes. Sheets are used for die cut parts (such as gears, washers, and gaskets). Tubes are used for control cable inners (which are small diameter tubes that serve as conduits for push/pull cables).

SUMMARY OF THE INVENTION

The present invention relates to polyoxymethylene compositions containing at least one encapsulated nucleant made from an encapsulant polymer and a nucleant, wherein the encapsulant polymer has a solid density of equal to or less than 1 gram per cubic centimeter and is selected from linear low density polyethylene, high density polyethylene, and polypropylene and further wherein the encapsulated nucleant is added to the polyoxymethylene composition such that the amount of the nucleant in the composition is 0.001–0.5 weight percent, as based upon the weight of the polyoxymethylene alone.

The resultant polyoxymethylene compositions are characterized as having improved center line porosity values in comparison to comparable polyoxymethylene compositions. The compositions of the present invention are especially useful in those applications where polyoxymethylene is extruded into stock shapes, such as rod, slab, tube, and sheet stock shapes.

DETAILED DESCRIPTION OF THE INVENTION

It was found in the present invention that the presence of an encapsulated nucleant in polyoxymethylene reduces the center line porosity of stock shaped extruded parts of polyoxymethylene compositions.

In the extrusion of polyoxymethylene compositions into stock shapes, such as rod, slab, sheet, and tube stocks, it is found that "voids" or "porosity" can occur in the center of the stock shape. In the present application, and as is generally known in the art, the terms "voids" and "porosity" are used interchangeably. These "voids" can be measured and a "center line porosity value" can be calculated from such measurements. As the amount of voids, or porosity, in the stock shape increases, the center line porosity value for the stock shape increases, and the defects in the stock shape correspondingly increase.

There exists a need to create polyoxymethylene compositions that, when extruded into stock shapes, will have few or no voids. It is further desirable to attain reduced center line porosity values without significantly slowing the rate at which extrusion proceeds. In the present invention, it was found that polyoxymethylene compositions containing certain encapsulated nucleants made from an encapsulant polymer and a nucleant had improved center line porosity values, without sacrificing extrusion rate, versus (1) comparable polyoxymethylene compositions that lacked the encapsulated nucleant, (2) comparable polyoxymethylene compositions containing only the nucleant or only the encapsultant polymer, and (3) comparable polyoxymethylene compositions wherein the encapsulant polymer and the nucleant were separately fed into the polyoxymethylene during compounding processes.

1. The Compositions

The compositions of the present invention consist essentially of (a) at least one "polyoxymethylene" and (b) at least one "encapsulated nucleant".

1a. Component (a): Polyoxymethylene

The component (a) "polyoxymethylene" as used herein includes homopolymer of formaldehyde or cyclic oligomer of formaldehyde, the terminal groups of which are end capped by esterification or etherification, and copolymers of formaldehyde or of cyclic oligomer of formaldehyde and other monomers that yield oxyalkylene groups with at least two adjacent carbon atoms in the main chain, the terminal groups of which copolymers can be hydroxyl terminated or can be end capped by esterification or etherification.

The polyoxymethylenes used in the present invention can be branched or linear and will generally have a number average molecular weight in the range of 10,000 to 100,000, preferably 30,000 to 75,000. The molecular weight can conveniently be measured by gel permeation chromatography in m-cresol at 160° C. or, alternatively, in hexafluoro isopropanol at room temperature, using a Du Pont PSM bimodal column kit with nominal pre size of 60 and 1000 Å. Although polyoxymethylenes of higher or lower number average molecular weights can be used, depending on the physical and processing properties desired, the polyoxymethylenes with the above mentioned number average molecular weight are preferred to provide optimum balance of good mixing of various ingredients to be melt blended into the composition with the most desired combination of physical properties in the extruded stock shapes made from such compositions.

As indicated above, the polyoxymethylene can be either homopolymer with different number average molecular weights, copolymers of different number average molecular weights or probable mixtures thereof. Copolymers can contain one or more comonomers, such as those generally used in preparing polyoxymethylene compositions. Comonomers more commonly used include alkylene oxides of 2-12 carbon atoms and their cyclic addition products with formaldehyde. The quantity of comonomer will not be more than 20 weight percent, preferably not more than 15 percent, and most preferably about 2 weight percent. The most preferred comonomer is ethyleneoxide. Generally polyoxymethylene homopolymer is preferred over copolymer because of its greater tensile strength and stiffness. Preferred polyoxymethylene homopolymers include those whose terminal hydroxyl groups have been end capped by a chemical reaction to form ester or ether groups, preferably acetate or methoxy groups, respectively.

1b. Component (b): Encapsulated Nucleant

The component (b) "encapsulated nucleant" as used herein consists essentially of component (b)(1) an encapsulant polymer and component (b)(2) a nucleant.

The component (b)(1) encapsulant polymer of the encapsulated nucleant is selected from linear low density polyethylene ("LLDPE"), high density polyethylene ("HDPE"), and polypropylene, each of which have a solid density of less than or equal to 1 gram per cubic centimeter, as measured by ASTM D1505. Preferably, the encapsulant polymer is either LLDPE or HDPE. The encapsulant polymer either lacks long chain polymer branching in its molecular structure or it is predominantly linear. The lack of long chain branching is due to the method by which the encapsulant polymer is produced.

The encapsulant polymer is selected from a group of polymers well known in the art. The encapsulant polymers are commercially available or, alternatively, can be prepared by techniques readily available to those skilled in the art. Generally, the encapsulant polymers are prepared by polymerizing ethylene or ethylene and alpha-olefin comonomers in solution phase or gas phase reactors using coordination catalysts, particularly Zieglar or Phillips type catalysts.

It is preferred that the LLDPE encapsulant polymer have a melt index, as measured by ASTM D1238 method, condition E, in the range of 5 to 55 grams per 10 min. It is preferred that the HDPE encapsulant polymer have a melt index, as measured by ASTM D1238 method, condition E, of about 0.5-7 grams per 10 min. Compositions containing LLDPE or HDPE having melt indices outside the range given above may yield stock shapes with good porosity values, but can give rise to compounded resin and extruded stock shapes having other undesirable characteristics, such as decreased stability or separation of the polyoxymethylene and LLDPE or HDPE (i.e., de-lamination).

It should be understood that some commercially available encapsulant polymers may contain additional additives or ingredients customarily included therein and that some of the additives or ingredients can have an adverse effect on the oxidative or thermal stability of polyoxymethylene. Further, the encapsulant polymers may contain some impurities that can have an adverse effect on the oxidative or thermal stability of polyoxymethylene and hence should be avoided.

The nucleant of the encapsulated nucleant is any finely divided solid, such as boron nitride, talc, silica (such as Celite ®), polyimides (such as Vespel ®), copper phthalocyanine (some times also known as phthalocyanine blue), calcium carbonate, diatomite, dolomite, or other commonly known nucleants for polyoxymethylene. Boron nitride and talc are preferred, with talc being most preferred. The nucleant can also be surface treated by standard processes.

Small average particle size is preferred for the nucleant. It is recommended that the average particle size of the nucleant be about 0.01-20 microns, preferably about 0.02-10 microns, and most preferably about 0.05-5 microns. The particle size of the nucleant can be conveniently measured by scanning electron microscopy (SEM).

The encapsulated nucleant consists essentially of 10-50 weight percent of the nucleant and 90-50 weight percent of the encapsulant polymer. Preferably, the encapsulated nucleant consists essentially of 20-45 weight percent of the nucleant and 80-55 weight percent of the encapsulant polymer; most preferably, it consists essentially of 25-35 weight percent of the nucleant and 75-65 weight percent of the encapsulant polymer. All weight percents given in this paragraph are based upon the weight of the nucleant and the encapsulant polymer only.

The encapsulated nucleant can be obtained commercially or can be prepared by techniques readily available to those skilled in the art. As an example, the encapsulated nucleant can be prepared by mixing and compounding the nucleant and the encapsulant polymer together, using any intensive mixing device, such as Foul Continuous Mixers or high intensity stirrer mixers, internal mixers such as "Banbury" and Brabender mixers, single or multiple internal mixers with a cavity heated externally or by friction, "Ko-kneaders", multi-barrel mixers such as "Farrell Continuous Mixers", extruders, etc. These devices can be used alone or in combination with static mixers, mixing torpedoes, and/or various devices to increase internal pressure and/or the intensity of mixing, such as valves, gates, or screws designed for this purpose. The nucleant and encapsulant polymer are compounded together at a temperature at which the encapsulant polymer melts while the nucleant does not melt. The nucleant and the encapsulant polymer are typically compounded at 120° C.-170° C. The encapsulated nucleant can then be finally pelletized in preparation for compounding into polymer.

It should be understood that other additives typically used in thermoplastic polymers can be present in the encapsulated nucleant, such as stabilizers, antioxidants, etc.

Transmission electron microscopy of a polyoxymethylene composition containing the encapsulated nucleant will show that the nucleant is encapsulated in the encapsulant polymer.

The encapsulated nucleant is added to the polyoxymethylene composition such that the amount of the nucleant added to the polyoxymethylene composition is 0.001-0.5 weight percent, preferably, 0.01-0.4 weight percent, and most preferably, 0.02-0.2 weight percent, as based upon the weight of the polyoxymethylene only.

1c. Additional Ingredients

It should be understood that the compositions of the present invention can include, in addition to the polyoxymethylene and the encapsulated nucleant, other ingredients, modifiers and additives as are generally used in polyoxymethylene resins, including, but not limited to, thermal stabilizers and co-stabilizers, antioxidants, pigments, colorants, toughening agents, reinforcing agents, UV stabilizers, hindered amine light stabilizers, lubricants (such as silicon oil, polyethylene glycol, and ethylene bis-stearamide), glass, polytetrafluoroethylene type extrusion aids, optical brighteners, and fillers.

Suitable thermal stabilizers include nylon type polymers (and especially as described in U.S. Pat. No. 4,098,843); poly-beta-alanine (as described in, for example, West German published application 3715117); the stabilizers disclosed in U.S. Pat. Nos. 4,814,397; 4,766,168; 4,640,949; and 4,098,984; the stabilizers disclosed in U.S. Pat. No. 5,011,890 (preferably, polyacrylamide) and U.S. Pat. No. 5,086,096, and mixtures of any of the above, especially mixtures described in U.S. Pat. Nos. 4,972,014 and 5,063,263. Preferably, thermal stabilizers are present in the compositions of the present invention in the quantity of 0.1 to 5 weight percent, most preferably 0.5 to 2 percent, based upon total composition weight.

Suitable antioxidants include hindered phenol commonly used in polyoxymethylene compositions. Examples of such hindered phenols include 2,2'-methylene-bis(4-methyl-6-tert-butyl phenol); 4,4'-butylidene-bis(2-(1,1-dimethylethyl)-5-methyl-phenol); triethyleneglycol-bis-3(tert-butyl-4-hydroxy-5-methphenyl)propionate; 1,6-hexamethylene-bis-3-(3,5-di-tert-butyl-4-hydroxyphenyl)-propionate); pentaerythritol-tetrakis-3-(3,5-di-tert-butyl-4-hydroxyphenyl)propionate and N,N'hexamethylene-bis-3-(3,5-di-tert-butyl-4-hydroxyphenyl)propionamide. Preferred antioxidants include triethyleneglycol-bis-3(tert-butyl-4-hydroxy-5-methphenyl)propionate; N,N'hexamethylene-bis-3-(3,5-di-tert-butyl-4-hydroxyphenyl)propionamide and mixtures thereof. The antioxidant is preferably present in the compositions of the present invention in the quantity of 0.01 to 1.0 weight percent, most preferably 0.02 to 0.8 weight percent, based upon total composition weight.

2. Preparation of the Compositions and Stock Shapes Thereof

The compositions of the present invention can be prepared by techniques readily available to those skilled in the art. Typically, the encapsulated nucleant is prepared and then compounded with the polyoxymethylene. The compounded compositions are then extruded into suitable stock shapes. Given below is a general description of how to make the compositions of the present invention.

2a. Compounding

The encapsulated nucleant, and any other additional ingredients, can be mixed or compounded into polyoxymethylene using any intensive mixing device conventionally used in preparing thermoplastic polyoxymethylene compositions, such as rubber mills, internal mixers such as "Banbury" and "Brabender" mixers, single or multiple internal mixers with a cavity heated externally or by friction, "Ko-kneaders', multibarrel mixers such as "Farrel Continuous Mixers", injection molding machines, and extruders, both single screw and twin screw, both co-rotating and counter rotating. These devices can be used alone or in combination with static mixers, mixing torpedoes and/or various devices to increase internal pressure and/or the intensity of mixing, such as valves, gates, or screw designed for this purpose. Extruders are preferred. Of course, such mixing should be conducted at a temperature below which significant degradation of the polyoxymethylene component of the composition will occur. Generally, polyoxymethylene compositions are melt processed between 170° C. to 280° C., preferably between 175° C. to 240° C., and most preferably 180° C. to 225° C.

2b. Extrusion into Stock Shapes

The compounded compositions can be extruded into stock shapes by melting the compounded composition in an extruder then pumping under pressure the molten polymer composition through a die and into a forming box, said forming box being in the form of the desired stock shape. The forming box is cooled and as such, the molten polymer composition starts to freeze on entering the forming box. As the molten polymer composition shrinks from cooling, more of the molten polymer composition is pumped, or "packed", into the forming boxes. The quality of the resultant stock is controlled by a stock puller, or a similar device, and the take-off rate of extrusion. In contrast to compounding processes, a take-off device used in the stock extrusion process acts as a brake, rather than as a puller, due to the fact that stock is packed under pressure and the pressure pushes the stock out of the forming box, thus creating a need for the stock to be held back with an equal pressure. After packing and extrusion are complete, the resultant stock shape is typically annealed to relieve stress and to stabilize the dimensions. Generally, polyoxymethylene compositions are extruded into stock shapes at temperatures between 170° C. to 280° C., preferably, between 175° C. to 240° C., and most preferably, 180° C. to 225° C., and pressures of 0.4 to 2 kpsi.

EXAMPLES

In the following examples, there are shown specific embodiments of the present invention and certain comparisons with embodiment of control experiments outside the limits of the present invention. It will be seen that the compositions of the present invention are characterized by reduced center line porosity at constant extrusion rates or, alternatively, comparable center line porosity at increased extrusion rates. All parts and percentages are by weight (and are based upon total composition weight) and all temperatures are in degrees Celsius, unless otherwise specified. Measurements not originally in SI units have been converted and rounded where appropriate.

Density and melt index were measured as described above for the encapsulant polymer.

A. Preparation of Sample Compositions

The components used in the sample compositions of the Examples below were as follows:

Polyoxymethylene

"POM" was an acetate end capped polyoxymethylene homopolymer having a number average molecular weight of about 64,000.

Encapsulant Polymers (a) "LLDPE 1" was a linear low density polyethylene copolymer of ethylene and butene having a melt index of about 53 dg/min and a solid density of 0.92 g/cm$^3$; it was commercially available as Sclair® 2114 (sold by Du Pont of Canada).

(b) "LLDPE 2" was a linear low density polyethylene copolymer of ethylene and butene having a melt index of about 20 dg/min and a solid density of 0.92 g/cm$^3$; it was commercially available as Sclair® 2111 (sold by Du Pont of Canada).

(c) "HDPE" was a high density polyethylene having melt index of 5 dg/min and a solid density of 0.96 g/cm$^3$; it was commercially available as Sclair® 2907 (sold by Du Pont of Canada).

Nucleants (a) "Talc1" was a talc reported to have an average particle size <5 microns; it was commercially available as Vantalc 6 H (sold by R. T. Vanderbuilt).

(b) "Talc2" was a surface treated talc reported to have an average particle size of 1.5 micron; it was commercially available as Microtuff 1000 (sold by Pfizer, Inc.).

Encapsulated Nucleant

"Enc Nuc1" was an encapsulated nucleant system of 30% "Talc2" and 70% "HDPE", each of which is described above; it was commercially available as Zemid® 640 (sold by Du Pont of Canada).

"Enc Nuc2" was an encapsulated nucleant system of 10% "Talc1" and 90% "LLDPE1", each of which is described above. It was prepared by mixing the components together in a Killion 70 mm single screw extruder, with barrel temperature settings in the range of 120° C.–170° C. and screw speed readings of 50–70 rpm.

"Enc Nuc3" was an encapsulated nucleant system of 10% "Talc1" and 90% "LLDPE2", prepared the same way as "Enc Nuc2".

Each composition tested additionally contained 1.0 weight percent of a thermal stabilizer system recommended for use in polyoxymethylene. Each composition tested also contained 0.2 weight percent of antioxidants recommended for use in polyoxymethylene. The use of thermal stabilizers and antioxidants is not necessary to the operability of the present invention. Thermal stabilizers were used in the following examples to improve thermal, oxidative, and aging stability and they do not exert a major influence on the center line porosity of the sample compositions tested. Antioxidants were used to improve the oxidative and aging stability of the sample compositions tested.

Unless otherwise specified, the components of each sample composition were mixed together and melt compounded on a 70 mm Killion single screw extruder (TABLE II) or a 62 mm Sterling single screw extruder (TABLE I), with barrel temperature settings in the range of 180° C. to 200° C. and screw speed readings of 40–100 rpm. The temperature of the melt for the compositions as it exited the die ranged from 215° C. to 230° C. The product exiting the die was quenched in a water bath and pelletized into cuts of about 3 mm in diameter and 6 mm in length.

The compositions of TABLE I and TABLE II, below, were then extruded into stock shapes using standard state of the art equipment. Specifically, stock shaped parts were prepared using a 45 mm Bandera single screw extruder, with barrel temperature settings ranging from 180° C. to 220° C. and melt pressure settings of 0.4 to 1.25 kpsi. All compositions were extruded at the same output rate (63 mm per minute) and into the same stock shape (81 mm diameter rod stock).

B. Testing of the Sample Compositions

Center line porosity values for the sample compositions were determined as described below.

A microtomed slice, having a film thickness of 0.01 to 0.02 mm, was taken from the center of the stock shape, in a way that the slice contained the entire porous area of the stock shape. An optical photomicrograph was taken of the center line porosity of the slice at a magnification of 8.15× to 50×. The photomicrograph was analyzed for porosity using a Quantimet-900 or Quantimet-970 Image Analyzer made by Cambridge Instruments, Inc. (While small differences exist in the hardware between these two instruments, they are functionally identical and yield identical results of the analysis.) The photomicrograph was placed on the light table associated with the Image Analyzer. A high resolution video scanner then created a signal from the photomicrograph, which was then digitized into an array of 896×704 pixel (picture points), each consisting of a value which varied from 0 to 63, depending on the brightness of the image at that pixel. A digitized image was created from the picture points.

The digitized image was then calibrated, using the known magnification of the photomicrograph, a metric scale (ruler), and the calibration function of the Image Analyzer.

The digitized image was then converted to a binary (on-off) image by selecting on the Image Analyzer a threshold value of gray (brightness). "Center Line Porosity Values" were calculated from the binary image by the Image Analyzer. The values reported in the tables below are averaged from the Center Line Porosity Value determined for 3–5 microtomed slices, taken along the length of the sample, for each sample stock shape.

EXAMPLES 1–2

The components for Examples 1–2 and Control Examples C1–C4, along with the test results for each example, are described in TABLE I, below. Examples 1–2 and the Control Examples each contained the same thermal stabilizer system and the same antioxidant system.

In Control Example C4, the encapsulant polymer and the nucleant were individually, or separately, fed into the polyoxymethylene. In Examples 1 and 2, an encapsulated nucleant was compounded, or fed, into the polyoxymethylene.

The composition of Control Example C2, which contained 5% "LLDPE1" alone, had worse center line porosity than did the polyoxymethylene control composition (Control Example C1). The composition of Control Example C3, which contained 0.05% "Talc1" alone, had significantly better center line porosity than did the polyoxymethylene control composition (Control Example C1). The composition of Control Example C4, which contained 5% "LLDPE1" and 0.05% "Talc1" and which were separately fed into the polyoxymethylene, had about the same center line porosity as did the composition of Control Example C3, which contained "Talc1" alone. The composition of Example 1, however, which contained 5.05% "Enc Nuc2", an encapsulated nucleant, had better center line porosity than the polyoxymethylene control (Control Example C1), the composition of Control Example C3 (containing "Talc1" alone), and the composition of Control Example C4 (separately fed 5% "LLDPE1" and 0.05% "Talc1"). Such improvements were attained without a reduction in extrusion rate.

TABLE I

| Eg. No. | Encapsulant (Wt. %) | Nucleating Agent (Wt. %) | Comment | Center Line Porosity (Sqmm.) |
|---|---|---|---|---|
| C1 | — | — | — | 1.13 |
| C2 | 5% "LLDPE1" | — | — | 1.38 |
| C3 | — | 0.05% "Talc1" | — | 0.16 |
| C4 | 5% "LLDPE1" | 0.05% "Talc1" | Separate Feed | 0.15 |
| 1 | 5% "LLDPE1" | 0.05% "Talc1" | "EncNuc2"; 5.05% Added | 0.05 |
| 2 | 0.12% "HDPE" | 0.05% "Talc2" | "EncNuc1"; 0.17% Added | 0.02 |

EXAMPLES 3–5

The components for Examples 3–5 and Control Examples C5–C13, along with the test results for each sample composition, are described in TABLE II, below.

Examples 3–5 and the Control Examples C5–C13 each contained the same thermal stabilizer system and the same antioxidant systems (but not the same systems as used in Examples 1–2 and Control Examples C1–C4, above).

Best results were obtained when an encapsulated nucleant was added to the polyoxymethylene, as opposed to when the same nucleant and the same encapsulant polymer from the encapsulated nucleant were separately fed into the polyoxymethylene.

TABLE II

| Eg. No. | Encapsulant (Wt. %) | Nucleating Agent (Wt. %) | Comment | Center Line Porosity (Sqmm.) |
|---|---|---|---|---|
| C5 | — | — | — | 3.78 |
| C6 | 0.45% "LLDPE1" | — | — | 4.13 |
| C7 | 0.45% "LLDPE2" | — | — | 5.08 |
| C8 | 0.12% "HDPE" | — | — | 3.97 |
| C9 | — | 0.05% "Talc1" | — | 1.32 |
| C10 | — | 0.05% "Talc2" | — | 1.27 |
| C11 | 0.12% "HDPE" | 0.05% "Talc2" | Separate Feed | 1.06 |
| 3 | 0.12% "HDPE" | 0.05% "Talc2" | "EncNuc1"; 0.17% Added | 0.02 |
| C12 | 0.45% "LLDPE1" | 0.05% "Talc1" | Separate Feed | 0.69 |
| 4 | 0.45% "LLDPE1" | 0.05% "Talc1" | "EncNuc2"; 0.5% Added | 0.23 |
| C13 | 0.45% "LLDPE2" | 0.05% "Talc1" | Separate Feed | 0.09 |
| 5 | 0.45% "LLDPE2" | 0.05% "Talc1" | "EncNuc3"; 0.5% Added | 0.05 |

I claim:

1. A composition consisting essentially of
   (a) at least one polyoxymethylene and
   (b) at least one encapsulated nucleant, said encapsulated nucleant consisting essentially of
      (b)(1) 50–90 weight percent of an encapsulant polymer selected from the group consisting of linear low density polyethylene, high density polyethylene, and polypropylene, and wherein the encapsulant polymer has a solid density of equal to or less than 1 gram per cubic centimeter, and
      (b)(2) 10–50 weight percent of a nucleant, and wherein the weight percent of component (b)(1) and component (b)(2) is based upon the weight of component (b)(1) and component (b)(2) only, and provided that the quantity of the component (b) encapsulated nucleant added to the composition is such that the quantity of the component (b)(2) nucleant in the polyoxymethylene composition is 0.001–0.5 weight percent, as based on the weight of the polyoxymethylene component only.

2. The composition of claim 1 wherein the polyoxymethylene is a homopolymer.

3. The composition of claim 1 wherein the polyoxymethylene is a copolymer.

4. The composition of claim 1 wherein the component (b)(2) nucleant is selected from the group consisting of boron nitride, talc, silica, polyimides, copper phthalocyanine, calcium carbonate, diatomite, and dolomite.

5. The composition of claim 1 wherein the component (b)(2) nucleant is selected from the group consisting of boron nitride and talc.

6. The composition of claim 1 for use in making stock shapes.

7. The composition of claim 1 further consisting essentially of at least one of thermal stabilizers, co-stabilizers, antioxidants, pigments, colorants, toughening agents, reinforcing agents, UV stabilizers, lubricants, glass, polytetrafluoroethylene, and fillers.

* * * * *